UNITED STATES PATENT OFFICE.

MAX BAZLEN, OF LUDWIGSHAFEN, GERMANY, ASSIGNOR TO THE BADISCHE ANILIN AND SODA FABRIK, OF SAME PLACE.

INDIGO-WHITE COMPOUND AND PROCESS OF MAKING SAME.

SPECIFICATION forming part of Letters Patent No. 657,307, dated September 4, 1900.

Application filed May 22, 1900. Serial No. 17,546. (No specimens.)

*To all whom it may concern:*

Be it known that I, MAX BAZLEN, doctor of philosophy, a subject of the King of Würtemberg, residing at Ludwigshafen-on-the-Rhine, in the Kingdom of Bavaria and Empire of Germany, have invented new and useful Improvements in Stable Indigo-White Compounds, of which the following is a specification.

My invention relates to the production of a new compound of indigo-white, which is stable in the presence of air, but which by the action of caustic alkalies is readily reconverted into indigo-white or indigo.

My new body can be obtained by acting on indigo-white suspended or dissolved in water, acetone, alcohol, or other suitable medium with phosgene in the presence of caustic-soda lye.

The following example will serve to show how my invention may be carried into practical effect and my new product obtained: Dissolve fifty (50) parts of indigo-white in five hundred (500) parts of acetone, add fifty (50) parts of caustic-soda lye (containing about thirty-five per cent NaOH) and pass phosgene into this mixture while agitating and cooling with ice until a drop of the solution made alkaline and brought on to filter-paper no longer becomes blue. The greater part of the reaction product separates out as a difficultly-soluble body and is filtered off. To obtain the remainder neutralize the filtrate with solid sodium carbonate and distil off the acetone.

Instead of acetone water or alcohol may be employed in the above example. When using alcohol, however, the product obtained is not quite so pure.

My new product is a powder, which is, as a rule, more or less dark colored and is stable in the presence of air. It is difficultly soluble or insoluble in most of the ordinary solvents and cold dilute caustic soda, but is somewhat soluble in boiling acetone. On warming with caustic-soda lye it is reconverted into indigo-white. By heating with concentrated sulfuric acid and pouring into water a blue solution is obtained.

Now what I claim is—

1. The process of producing a stable indigo-white body, by treating indigo-white with phosgene.

2. The process of producing an indigo-white body by treating indigo-white with phosgene in the presence of caustic soda.

3. As a new product, the body which can be obtained by treating indigo-white with phosgene which is stable in the presence of air, is practically insoluble in dilute cold caustic-soda lye, which on warming with caustic-soda lye yields an indigo-white vat, and which on being heated with concentrated sulfuric acid and poured into water yields a blue solution, substantially as described.

In testimony whereof I have hereunto set my hand in the presence of two subscribing witnesses.

MAX BAZLEN.

Witnesses:
PERCY J. JONES,
J. L. HEINKE.